(Model.)
D. LYMAN.
Running Gear for Wagons.
No. 230,300.  Patented July 20, 1880.
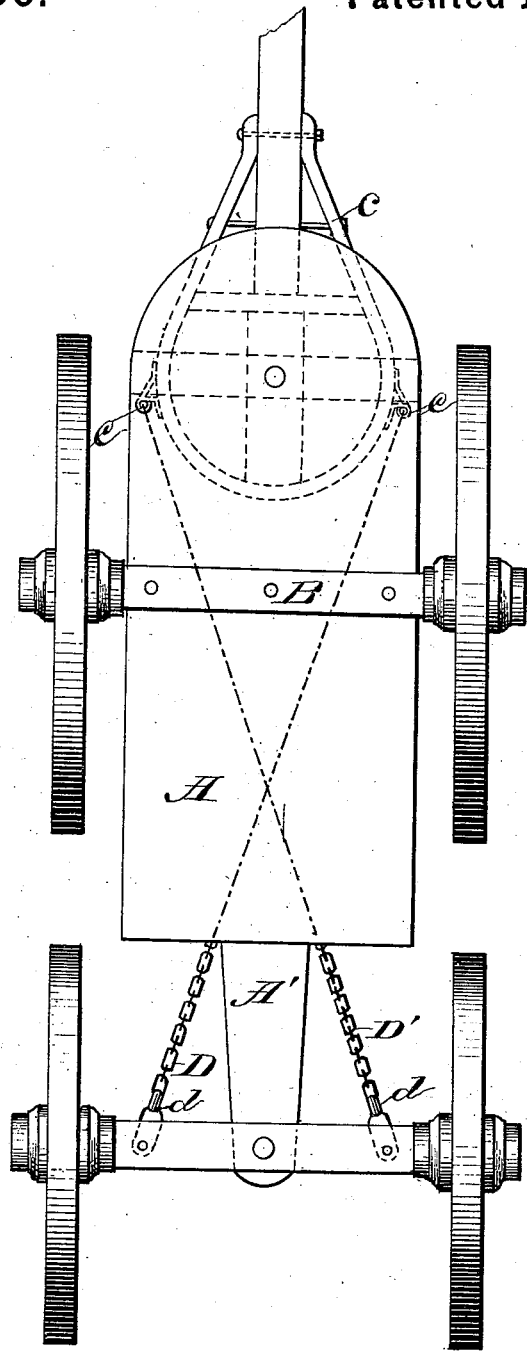
Witnesses:  Inventor:

UNITED STATES PATENT OFFICE.

DORUS LYMAN, OF RACINE, WISCONSIN.

RUNNING-GEAR FOR WAGONS.

SPECIFICATION forming part of Letters Patent No. 230,300, dated July 20, 1880.

Application filed May 11, 1880. (Model.)

*To all whom it may concern:*

Be it known that I, DORUS LYMAN, of Racine, in the county of Racine, and in the State of Wisconsin, have invented certain new and useful Improvements in Wagons; and I do hereby declare that the following is a full, clear, and exact description thereof.

The object of this invention is to simplify the running-gear of heavy wagons and make them more manageable, especially in turning.

The drawing is a plan of my invention.

A is what is termed the "rack," and is the platform upon which the load is carried, and this I attach directly to and beneath the forward axle, B, connecting it by an extension, A', to the under side of the hind axle.

The hound C is pivoted to the under side of the rack just inside of the wheels, and is provided with ears c c, to which are attached chains or rods D D', which cross each other about midway of the wagon on their way back to the rear axle, to which they are attached at d d.

The front wheels are the largest in my improved wagon, and the rack extends an equal distance on either side of the front axle, so that the major part of the weight to be carried is borne by the front axle, while the rear axle has but little weight to bear in comparison, and therefore will yield easily to the chains as the tongue is deflected by the animal or animals, so that the rear wheels will act as rudders to guide the front wheels.

By my construction I can draw a heavy load with much less worry to the animals than with any other wagon or wagons known to me, since I can make my front wheels largest and bring the weight to be drawn close up to the animals, and yet turn with perfect ease.

I am aware of the patent granted to L. W. Frederick, No. 185,909, January 2, 1877, and do not claim any construction embraced by it; but What I do claim, and desire to secure by Letters Patent, is—

The combination, in a wagon, of a rack suspended from the front axle and suitably pivoted to the rear axle with a hound or hounds pivoted to the front of the rack and connected with the rear axle by cross-chains D D', whereby the front wheels are guided by the rear wheels, as set forth.

In testimony that I claim the foregoing I have hereunto set my hand this 9th day of March, 1880.

DORUS LYMAN.

Witnesses:
E. H. BOTTUM,
S. S. STOUT.